United States Patent
Liu et al.

(10) Patent No.: US 8,010,122 B2
(45) Date of Patent: Aug. 30, 2011

(54) METHOD OF SCHEDULING DATA TRANSMISSION FOR A MULTI-CARRIER WIRELESS COMMUNICATION SYSTEM

(75) Inventors: Jun Qiang Liu, Beijing (CN); Wen Tao Zhang, Beijing (CN)

(73) Assignee: Alcatel Lucent, Paris (FR)

( * ) Notice: Subject to any disclaimer, the term of this patent is extended or adjusted under 35 U.S.C. 154(b) by 873 days.

(21) Appl. No.: 11/445,291

(22) Filed: Jun. 2, 2006

(65) Prior Publication Data
US 2007/0218918 A1 Sep. 20, 2007

(30) Foreign Application Priority Data
Mar. 15, 2006 (CN) .......................... 2006 1 0059213

(51) Int. Cl.
*H04W 72/00* (2009.01)
(52) U.S. Cl. ............... 455/452.1; 455/422.1; 455/435.1; 455/435.2; 455/450; 455/451; 455/452.2; 455/453; 370/310.2; 370/322; 370/329; 370/341; 370/348
(58) Field of Classification Search ............... 455/422.1, 455/450–453, 435.1, 435.2; 370/310.2, 322, 370/329, 341, 348
See application file for complete search history.

(56) References Cited

U.S. PATENT DOCUMENTS

| | | | |
|---|---|---|---|
| 6,606,311 B1 * | 8/2003 | Wang et al. | 370/338 |
| 6,728,875 B1 * | 4/2004 | Aguilar et al. | 713/2 |
| 6,879,840 B2 * | 4/2005 | Razavilar et al. | 455/522 |
| 7,065,367 B2 * | 6/2006 | Michaelis et al. | 455/452.2 |
| 7,164,669 B2 * | 1/2007 | Li et al. | 370/336 |
| 2003/0021245 A1 * | 1/2003 | Haumonte et al. | 370/330 |
| 2005/0107123 A1 * | 5/2005 | Ishii et al. | 455/560 |
| 2006/0083157 A1 | 4/2006 | Cheng et al. | |
| 2006/0183471 A1 * | 8/2006 | Samuel et al. | 455/423 |

FOREIGN PATENT DOCUMENTS
CN 1717884 1/2006

OTHER PUBLICATIONS

Chinese Office Action dated Jan. 20, 2011 for corresponding Chinese Patent Application No. 200610059213.7.

* cited by examiner

*Primary Examiner* — Stephen M D'Agosta
(74) *Attorney, Agent, or Firm* — Harness, Dickey & Pierce

(57) ABSTRACT

A method of scheduling at least one of a plurality of mobile stations for data transmission in a multi-carrier wireless communication system that includes scheduling at least one mobile station on at least one of a plurality of carriers of the multi-carrier wireless communication system based on RF measurements received from the plurality of mobile stations and a Quality of Service (QoS) of the plurality of mobile stations.

12 Claims, 5 Drawing Sheets

METHOD OF SCHEDULING DATA TRANSMISSION FOR A MULTI-CARRIER WIRELESS COMMUNICATION SYSTEM

PRIORITY STATEMENT

This non-provisional U.S. patent application claims priority under 35 U.S.C. §119 to Chinese Patent Application No. 200610059213.7, filed on Mar. 15, 2006, the entire contents of which are incorporated herein by reference.

BACKGROUND OF THE INVENTION

A cellular communications network typically includes a variety of communication nodes coupled by wireless or wired connections and accessed through different types of communications channels. Each of the communication nodes includes respective protocol stacks that process the data respectively transmitted and received over the communications channels. Depending on the type of communications system, the operation and configuration of the various communication nodes can differ and are often referred to by different names. Such communications systems include, for example, a Code Division Multiple Access 2000 (CDMA2000) system and a Universal Mobile Telecommunications System (UMTS).

Third generation wireless communication protocol standards (e.g., 3GPP-UMTS, 3GPP2-CDMA2000, etc.) may employ a dedicated traffic channel in the uplink (UL) (e.g., a communication flow from a mobile station (MS) or User Equipment (UE) to a base station (BS) or NodeB). The dedicated channel may include a data part (e.g., a dedicated physical data channel (DPDCH) in accordance with UMTS Release 99/4/5/6 protocols, a fundamental channel or supplemental channel in accordance with CDMA2000 protocols, etc.) and a control part (e.g., a dedicated physical control channel (DPCCH) in accordance with UMTS Release 99/4/5/6 protocols, a pilot/power control sub-channel in accordance with CDMA2000 protocols, etc.).

A Radio Frequency (RF) carrier in a wireless communication system is a fixed span of wireless spectrum band in which wireless signals are transmitted and received accordingly. In current Third Generation (3G) wireless systems, for the sake of simplicity and fast-time-to-market requirements, each user is only required to support a single carrier (SC) at any given time. Currently both the Third Generation Partnership Project 2 (3GPP2) and the Third Generation Partnership Project (3GPP) consider SC systems and define 1.25 MHz and 5 MHz spectrum for Frequency Division Duplex (FDD) and high chip rate Time Division Duplex (TDD), and 1.5 MHz spectrum for low chip rate TDD, as a unit of one carrier bandwidth for wireless communications.

However, with increasing competition pressures from wideband technologies, such as Worldwide Interoperability for Microwave Access (WiMax, with spectrum of 20-135 MHz) and Ultra Wideband (UWB, with spectrum of 500 MHz), an effort is under way both in 3GPP and 3GPP2 to support multi carrier (MC) systems. MC systems are different from SC systems, in that MC systems may distribute each user's traffic flow among multiple carriers rather than a single carrier. Distributing data to a user using multiple carriers and having each user support more than one carrier would provide data throughput 10 to 20 times higher than the data throughput of today's 3G systems.

Since most QoS control mechanisms are closely related with packet switched domain, FIG. 1 illustrates a conventional wireless communication system 100 operating in accordance with UMTS packet data protocols. Referring to FIG. 1, the wireless communication system 100 may include a number of NodeBs 110, each serving the communication needs of a user equipment UE 105 in a respective coverage area. The NodeBs 110 are connected to a radio network controller (RNC) 120. RNCs are connected to a Serving GPRS Support Node (SGSN) 130. The RNC 120 handles certain call and data handling functions, such as, autonomously managing handovers without involving a SGSN 130. The SGSN 130 handles routing calls and/or data to other elements (e.g., RNCs 120) in the Radio Access Network (RAN) 170 or to a core network including for example, a Gateway GPRS Support Node (GGSN) 140, a Policy Decision Function (PDF) 150 and an Application Function (AF) 160.

FIG. 2 illustrates a convention wireless communication system operating in accordance with CDMA2000 1xEV-DO protocols. Referring to FIG. 2, the wireless communication system 200 may include a number of base transceiver stations (BTS) 220, each serving the communication needs of user equipment or mobile stations (MS) 205 in a respective coverage area. The BTSs 220 are connected to a BSC 215. The BSC 215 is connected to a Packet Control Function (PCF) 225. The PCF 225 is connected to a Packet Data Serving Node (PDSN) 210, which is connected to a home Authentication, Authorization and Accounting Server (AAA) 230. BTSs 220 and BSC 215 of the conventional wireless communication system 200 function similar to their counter parts, NodeBs 110 and RNCs 120, respectively, in the conventional wireless communication system 100. Likewise, PCF 225 of wireless communication system 200 functions similar to SGSN 130 of wireless communication system 100; PDSN 210 of wireless communication system 200 functions similar to GGSN 140 of wireless communication system 100.

NodeBs 110 and BSC 215 typically include a scheduler implementing a scheduling algorithm that schedules (e.g., establishes transmission rates, etc.) for the UEs 105 and MSs 205. Various RF carrier scheduling algorithms such as Round Robin (RR), Highest Rate User First (HRUF), Shortest Remaining Processing Time fast (SRPT), Proportional Fairness (PF) etc. are well-known in the art and used to schedule UEs 105 and MSs 205 for transmission. However, none of the conventional scheduling methods can be implemented effectively in a MC system.

SUMMARY OF THE INVENTION

One or more example embodiments of the present invention are directed towards a method of scheduling data transmission in a multi-carrier communication system.

An example embodiment of the present invention provides a method of scheduling at least one of a plurality of mobile stations for data transmission in a multi-carrier wireless communication system. The method includes first scheduling at least one mobile station on at least one of a plurality of carriers of the multi-carrier wireless communication system based on RF measurements received from the plurality of mobile stations and a Quality of Service (QoS) of the plurality of mobile stations.

According to an example embodiment of the present invention, the first scheduling step includes creating a ranking matrix that includes a ranking list for each mobile station, and using the ranking matrix to prioritize the plurality of mobile stations for scheduling. The ranking list includes a ranking value for each of the plurality of carriers.

According to an example embodiment of the present invention, the creating step includes assigning a first value to each of the plurality of mobile stations for each of the plurality of carriers based on the RF measurements to generate a first list, and generating the ranking matrix based on the first list. The first value represents each of the plurality of mobile stations preference for each of the plurality of mobile carriers.

According to an example embodiment of the present invention, the creating step also includes assigning a second value to each of the plurality of mobile stations based on the QoS of each of the plurality of mobile stations to generate a second list. The second value represents the priority of each mobile station relative to other mobile stations of the plurality of mobile stations. Further, the generating step generates the ranking matrix based on the first list and the second list.

According to an example embodiment of the present invention, the generating step combines the first list and second list according to equation (1)

$$r_{i,j} = w_s \cdot s_{ij} + w_p \cdot p_j \; i=1, 2, \ldots, n; j=1, 2, \ldots m \quad (1)$$

wherein $r_{i,j}$ represents the ranking value, i represents a number of mobile stations, j represents a number of the carriers, $s_{ij}$ represents the first value of the first list, $p_j$ represents the second value of the second list and $w_s$ and $w_p$ are weighting factors.

According to an example embodiment of the present invention, the first scheduling step also includes selecting a mobile station to schedule and the carrier based on a ranking value corresponding to a highest priority; determining if the selected carrier can support the selected mobile station during a scheduling interval; and second scheduling the selected mobile station based on the determining step.

According to an example embodiment of the present invention, the determining step calculates a load for transmitting data from the selected mobile station, and determines if the selected mobile station should be scheduled on the selected carrier based on the calculated load.

According to an example embodiment of the present invention, the second scheduling step includes marking the selected mobile station as processed so the selected mobile station is only selected once during a scheduling interval.

According to an example embodiment of the present invention, the second scheduling step includes ascertaining if all of the mobile stations of the plurality of mobile stations are marked as processed and ending the scheduling cycle based on the ascertaining step According to an example embodiment of the present invention, the second scheduling step continues until all of the mobile stations of the plurality of mobile stations are marked as processed.

According to an example embodiment of the present invention, the creating step includes assigning a second value to each of the plurality of mobile stations based on the QoS of each of the plurality of mobile stations to generate a second list, and generating the ranking matrix based on the second list. The second value representing a priority of each mobile station relative to other mobile stations of the plurality of mobile stations.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limiting of the present invention and wherein.

DETAILED DESCRIPTION OF EXAMPLE EMBODIMENTS

Figure 1:
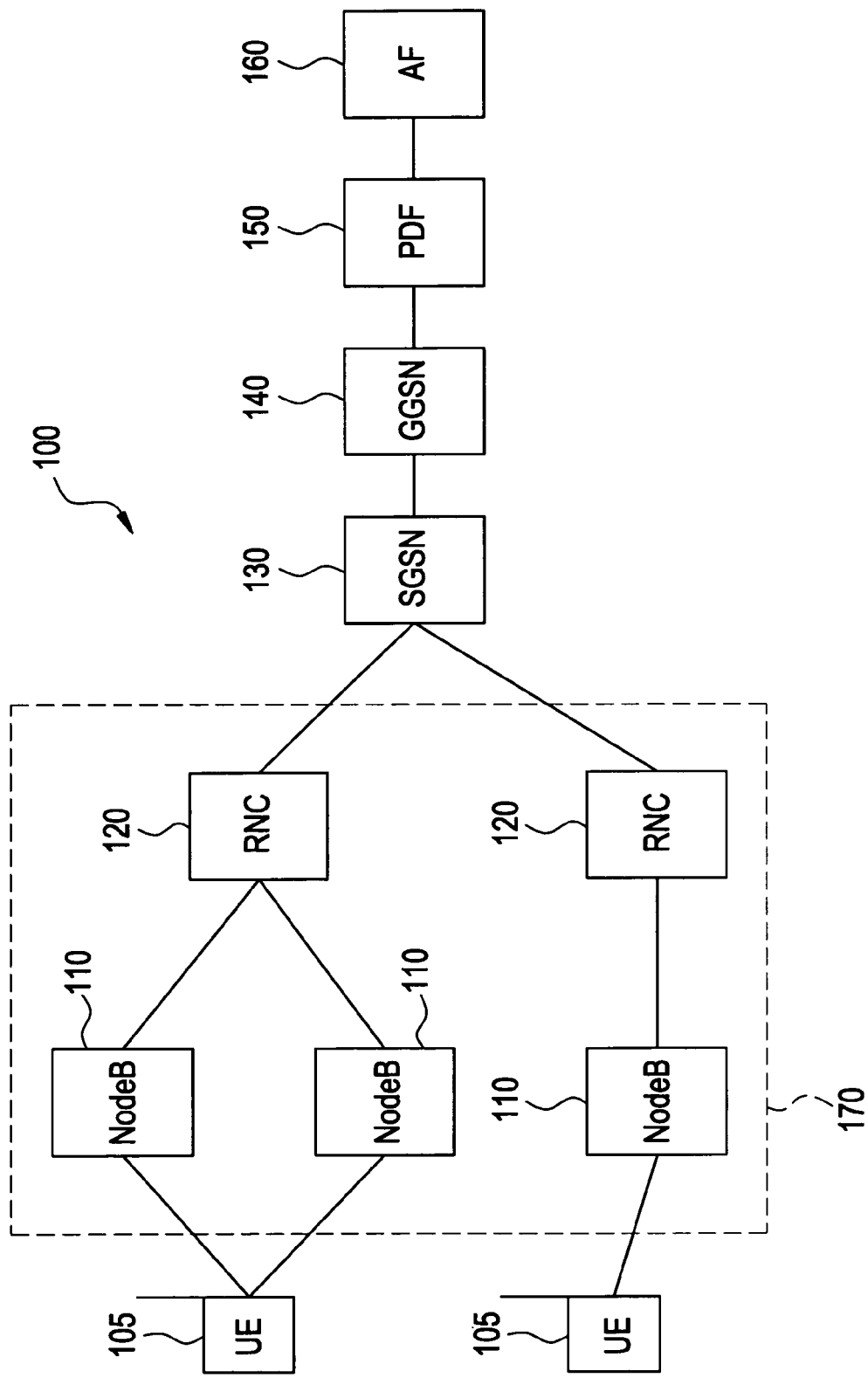
FIG. 1 illustrates a prior art wireless communication system operating in accordance with UMTS protocols.
Figure 2:
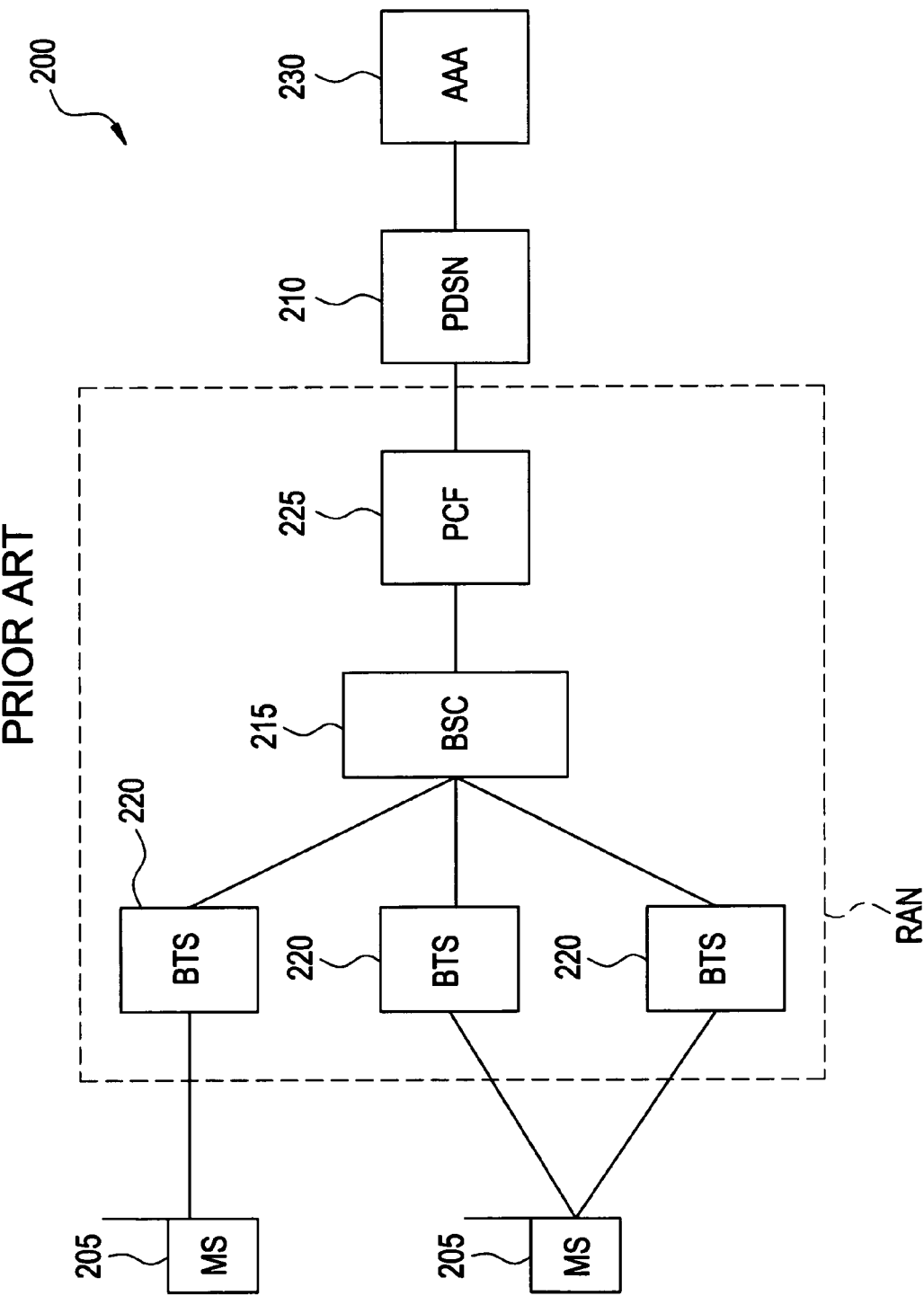
FIG. 2 illustrates a prior art wireless communication system operating in accordance with CDMA2000 1xEV-DO protocols.

The present invention relates to a method of scheduling data transmission for a multi-carrier wireless communication system. For the purposes of explanation only, the method embodiments of the present invention will be described as implemented on the conventional systems illustrated in FIGS. 1 and 2; however, it will be understood that the present invention is not limited in implementation to these systems.

Figure 3:
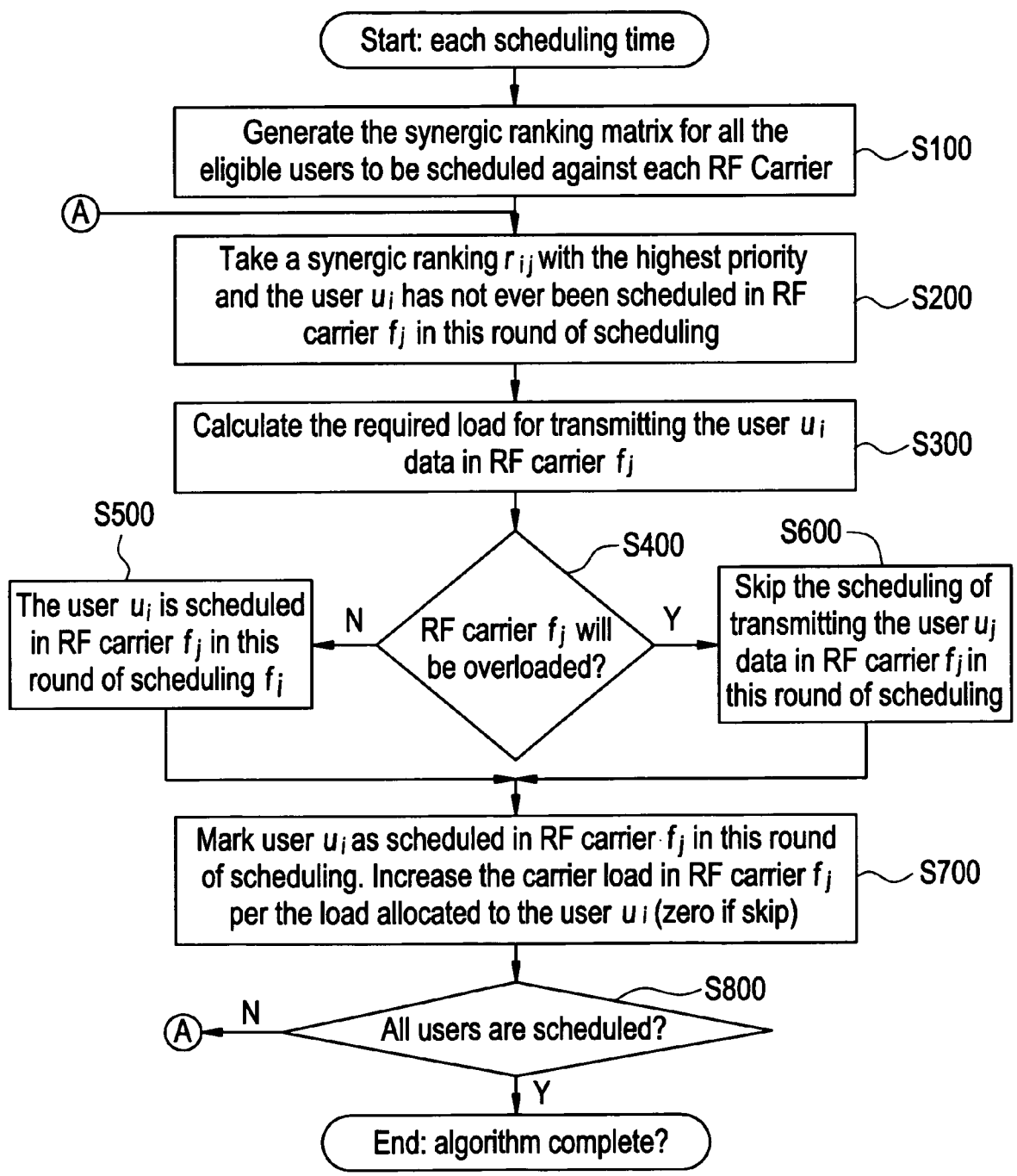
FIG. 3 is a flow chart of an example embodiment of a method of scheduling data transmissions for a multi-carrier system according to the present invention.

FIG. 3 is a flow chart illustrating a method of scheduling data transmissions for a multi-carrier system implemented at NodeBs 110 and BTSs 220, for example. The scheduling algorithm of FIG. 3 may be initiated in many ways well known in the art and thus will not be discussed in detail herein for the sake of brevity. For example, the scheduling algorithm may be performed at regular intervals.

In step S100 of FIG. 3, a synergic ranking matrix R is generated against each RF carrier for users eligible for scheduling. Eligible users are, for example, users initiating RF resource requests at the current scheduling time, denoted as $U=[u_1, u_2, \ldots u_n]$, wherein n represents the total number of eligible users. Determining that a user is initiating a RF resource request; determining that a RF resource request is received by a NodeB 110 or BTS 220; and determining a total number of eligible users n is well-known in the art and will not be discussed herein for the sake of brevity. However, it is noted that the users $u_1, u_2, \ldots u_n$ and the total number of users may change each scheduling interval.

The synergic ranking matrix R for users U is obtained through jointly considering an inter-user QoS ranking list P and an inter-carrier scheduling ranking list S. Example embodiments of the inter-user QoS ranking list P and the inter-carrier scheduling ranking list S used to create an example ranking matrix R are explained below with reference to FIGS. 3-5.

The inter-user QoS ranking list P is a list that depends on a user's high layer QoS priorities and is denoted as $P=[p_1, p_2, \ldots, p_n]$. According to an example embodiment of the present invention, the inter-user QoS ranking list P only depends on the user's high layer QoS priorities, regardless of RF variations. For a user(i), $p_i$ indicates that user's priority in terms of QoS priority.

In a wireless communication system operating according to the CDMA2000 1xEV-DO protocol, a "Subscriber QoS Profile" may be used to generate $p_i$. The Subscriber QoS Profile is typically created for each user(i) and pre-configured in an AAA 230. The Subscriber QoS Profile is used to indicate allowable QoS attributes assigned to each user. A Subscriber QoS Profile is already known and used in 3G systems and thus will not be explained in detail herein for the sake of brevity.

Figure 4:
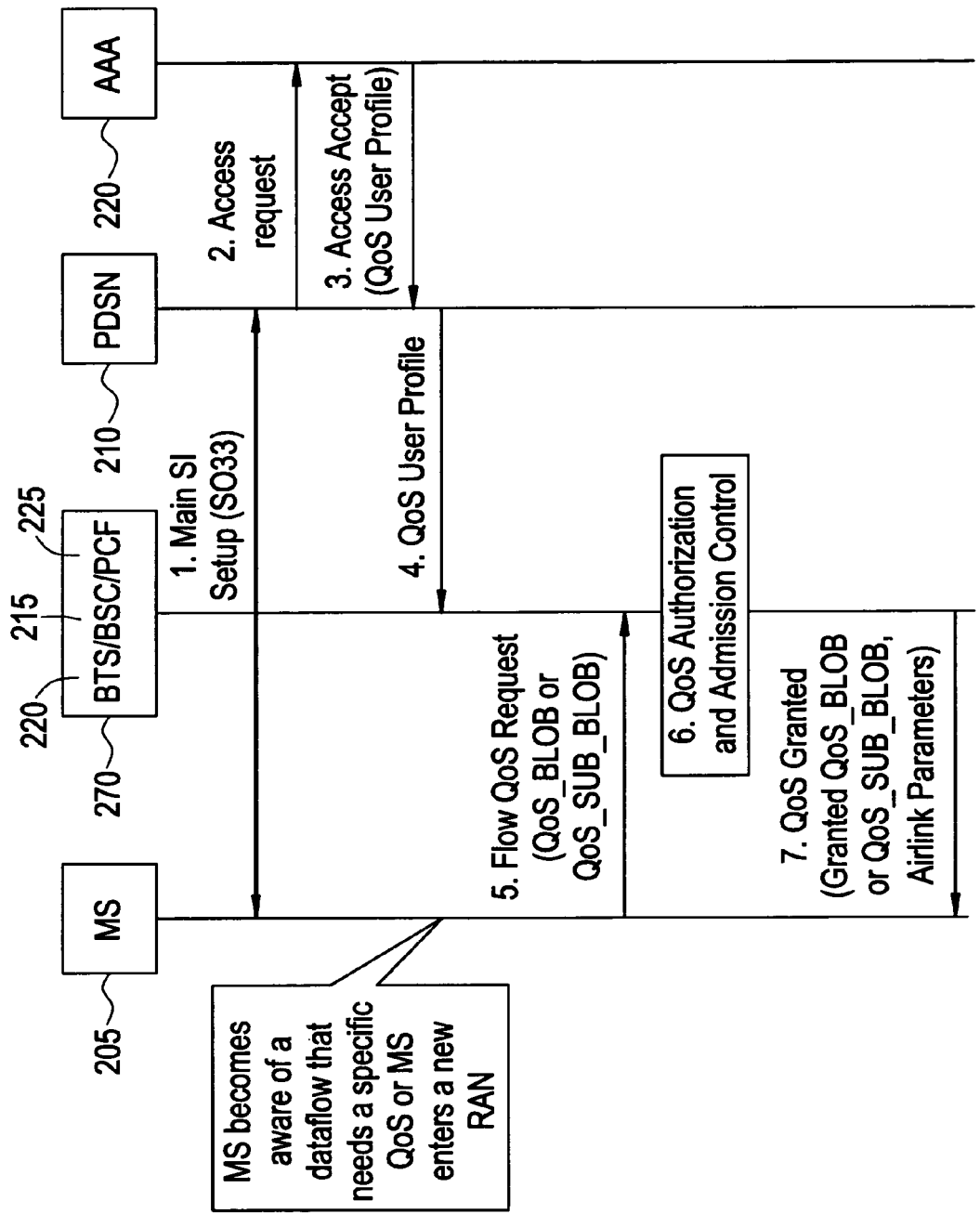
FIG. 4 is a signaling diagram illustrating the generation of an inter-user QoS ranking list P in a wireless communication system operating in accordance with CDMA2000 1xEV-DO protocols according to an example embodiment of the present invention.

FIG. 4 is a signaling diagram illustrating the generation of an inter-user QoS ranking list P in a wireless communication system operating in accordance with CDMA2000 1xEV-DO protocols according to an example embodiment of the present invention.

As shown, a user(i) MS 205 initiates a packet call to establish a point-to-point protocol (PPP) session between the user (i) MS 205 and Packet Data Serving Node (PDSN) 210 via a RAN 270. In FIG. 4, the BTS 220, BSC 215 and PCF 225 are treated as one for ease of explanation, and will be referred to herein as RAN 270. The PDSN 210 then sends an access request to the AAA 230 requesting the Subscriber QoS Profile for user(i) MS 205. In response to the access request from the PDSN 210, the AAA 230 authenticates the request from the PDSN 210 and sends the Subscriber QoS Profile to the PDSN 210 if the access request is authenticated. The PDSN 210, then passes the Subscriber QoS Profile to the RAN 270. After receiving the Subscriber QoS Profile from the PDSN 210, the RAN 270 obtains a parameter referred to as a "QoS ranking". Table 1 illustrates an example of a definition for the parameter "QoS ranking" in 3GPP.

TABLE 1

QoS Ranking Definition in 3GPP

| QoS ranking | Traffic class | Traffic handling priority |
|---|---|---|
| 1 | Interactive | 1 |
| 2 | conversational | Not applicable |
| 3 | streaming | Not applicable |
| 4 | Interactive | 2 |
| 5 | Interactive | 3 |
| 6 | Background | Not applicable |

Referring to Table 1, one of six different Inter-user QoS priority values may be assigned based on traffic classes and traffic handling priorities. According to an example embodiment of the present invention, QoS priority value $p_i$ equals the maximum QoS ranking value less the current QoS ranking value. The lower the QoS priority value $p_i$, the lower the priority that is assigned to the user based on the user request. For example, if user(1)'s traffic class is "interactive" and traffic handling priority is "2", then QoS ranking value $p_i$ is calculated as the following: 6−4=2. As a second example, if a user(2)'s traffic class is "Background" and traffic handling priority is "Not applicable", then QoS ranking value $p_i$ is calculated as the following: 6−6=0. As described above, the lower the QoS priority value $p_i$ the lower the priority that is assigned to the user based on the user request. With reference to the above, if the priority was based only on the QoS priority, user(1) would be scheduled prior to the user(2).

As indicated above, Table 1 is a QoS Ranking Definition for a 3GPP system. No QoS ranking is explicitly defined in a "Subscriber QoS Profile" of a 3GPP2 system. However, one skilled in the art will understand that a BS 220 may use traffic classes and a local traffic handling priority to generate a similar QoS ranking table used to calculate a QoS ranking value $p_i$.

Referring to FIG. 4, the user(i) MS 205 sends a service QoS request to the BSC 215. The service QoS request, as is well-known in the art, may include a traffic class and traffic handling priority. In response to the service QoS request, the BSC 215 performs an authorization and admission control procedure based on the service QoS request. For example, after the BSC 215 receives the service QoS request from the user(i) MS 205, the BSC 215 calculates the QoS ranking value $p_i$ for user(i) MS 205 based on the traffic class and traffic handling priority included in the service QoS request. The QoS ranking list $P=[p_1, p_2, \ldots, p_n]$ is then created that includes a QoS ranking value $p_i$ for each eligible user.

Figure 5:
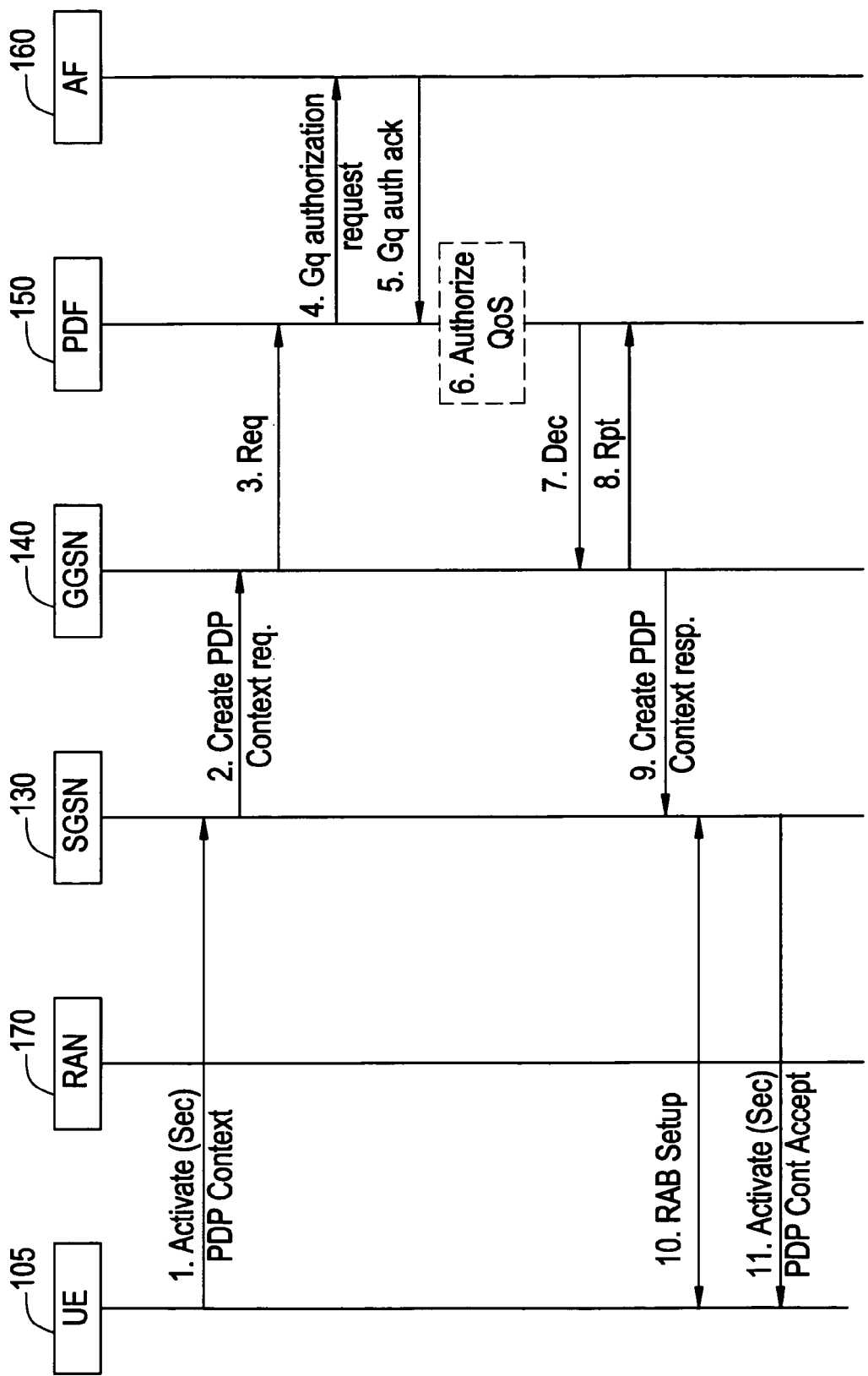
FIG. 5 is a signaling diagram illustrating the generation of an inter-user QoS ranking list P in a wireless communication system operating in accordance with UTMS protocols according to an example embodiment of the present invention.

FIG. 5 is a signaling diagram illustrating the generation of an inter-user QoS ranking list P in a wireless communication system operating in accordance with UTMS protocols according to an example embodiment of the present invention.

As shown in FIG. 5, a UE 105 sends an Activate (Secondary) PDP Context message containing a Requested QoS to an SGSN 130 via a RAN 170. The SGSN 130 generates and sends a corresponding Create PDP Context message containing the Requested QoS received from the UE 105 to a GGSN 140.

The GGSN 140 generates and sends a Common Open Policy Service Request (COPS REQ) message to a PDF 150 in order to obtain relevant policy information. The PDF 150 sends an authorization request to an AF 160 for the service information. The AF 160 sends the service information to the PDF 150. Based on information received from the AF 160, the PDF 150 shall authorize the required QoS resources for the AF session if the session description is consistent with the operator policy rules defined in the PDF 150, and install the IP bearer level policy in its internal database. Then, the PDF 150 sends a Common Open Policy Service Decision (COPS DEC) message back to the GGSN 140. The GGSN 140 sends a Common Open Policy Service Report (COPS RPT) message to the PDF 150.

The GGSN 140 then maps Internet Protocol (IP) flow based policy information into PDP context based policy information and uses the PDP context based policy information to accept the Activate PDP Context message received from the UE 105. To accept the Activate PDP Context message received from UE 105, the GGSN 140 sends an appropriate Create PDP Context Response message to the SGSN 130. Once the appropriate Create PDP Context Response message is received by the SGSN 130, a Radio Access Bearer (RAB) setup is completed using a RAB Assignment procedure performed between the SGSN 130 and Radio Network Controller (RNC) (not shown) of the RAN 170. The RAB is used to transmit and receive information from the UE 105 via a NodeB (not shown) of the RAN 170. As is well-known in the art, a RAB Assignment Request message transmitted during the RAB Assignment Procedure includes QoS parameters contained in a RAB Parameter. When the RAB is established successfully for the UE 105, the SGSN 130 then sends an Activate (Secondary) PDP Context Accept message to UE 105 as the response to the Activate (Secondary) PDP Context message.

According to an example embodiment of the present invention, the QoS parameters may be used by a NodeB (not shown) to calculate a QoS ranking value $p_i$ as described above (e.g., $p_i$ equals (maximum QoS ranking value—current QoS ranking value). The QoS ranking list $P=[p_1, p_2, \ldots p_n]$ is then created that includes a QoS ranking value $p_i$ for each eligible user.

In addition to generating the inter-user QoS ranking list P as discussed above with respect to examples illustrated in FIGS. 4 and 5, a BTS and/or NodeB must also generate an inter-carrier scheduling ranking list S to generate the synergic ranking matrix R.

An inter-carrier scheduling ranking list, denoted as $S_i=[s_{i,1}, s_{i,2}, \ldots s_{i,m}]$, is generated based on RF conditions where: i is an integer from 1 to n and m is the total number of carriers included in an MC wireless communication system. The inter-carrier scheduling ranking list S prioritizes the preference of RF carriers based on feedback from the user(i). The inter-carrier scheduling ranking list $S_i$ reflects a user's preference on the carriers from the perspective of the RAN 170, 270. A low carrier ranking value $s_{i,k}$, (i is an integer from 1 to n; k is an integer between 1 and m) indicates that carrier k is not desirable to user(i), and a carrier ranking value $s_{i,k}$ of zero indicates there is no report signal from a user(i) MS 205, UE 105 in the corresponding carrier k.

In most wireless communication systems, a user(i) periodically reports RF signals that the user(i) is aware of to the RAN 170, 270. In CDMA2000 1xEV-DV and UMTS HSDPA, the feedbacks are called Channel Quality Indicator (CQI) values and in CDMA2000 1xEV-DO, such feedbacks are called Data Rate Control (DRC) values. As such, both CQI values and DRC values are well-known in the art and will not be discussed in detail herein for the sake of brevity.

According to an example embodiment of the present invention, the inter-carrier scheduling ranking list $S_i$ is generated based on this feedback as will be described in the following example. For example, if feedback received from a user(i) regarding carrier 1 to carrier 6 is [−30.2 dBm, −23.4 dBm, −32.6 dBm, −7.5 dBm, −10.2 dBm, NOT Report], the inter-carrier scheduling ranking list $S_i$=[2,3,1,5,4,0]. This inter-carrier scheduling ranking list $S_i$ indicates that user(i) scheduling priorities from the perspective of the RAN 170, 270 on carrier 1 is 2, on carrier 2 is 3, on carrier 3 is 1, on carrier 4 is 5, on carrier 5 is 4, and on carrier 6 is 0. The 0 for carrier 6 indicates that user(i), for example MS 205 or UE 105, does not support carrier 6. As a second example, if the feedback from user(i) is [−31.2 dBm, −45.1 dBm, −12.4 dBm, −53 dBm, −3.5 dBm, −76 dBm], then the inter-carrier scheduling ranking list $S_i$ of that user shall be $S_i$=[4, 3, 5, 2, 6,1].

Referring back to step S100 of the flow chart in FIG. 3, a synergic ranking matrix R for users U is obtained through jointly considering an inter-user QoS ranking list P and an inter-carrier scheduling ranking list S. Accordingly, an inter-user QoS ranking list P and an inter-carrier scheduling ranking list S is generated for each user(i) at every scheduling time.

According to an example embodiment of the present invention, ranking list $R_i$ for each user(i) is created based on the inter-user QoS ranking list P and the inter-carrier schedule ranking list $S_i$. The ranking list for each eligible user is then combined to form a synergic ranking matrix R. An example synergic ranking matrix R is shown in Table 2 below and includes a synergic ranking value $r_{i,j}$; where i is an integer from 1 to n representing a user; and j is an integer from 1 to m representing a RF carrier.

TABLE 2

| Synergic Ranking Matrix R | | | |
|---|---|---|---|
| | RF Carrier $f_1$ | RF Carrier $f_2$ | RF Carrier ... | RF Carrier $f_m$ |
| user(1) | $r_{1,1}$ | $r_{1,2}$ | ... | $r_{1,m}$ |
| user(2) | $r_{2,1}$ | $r_{2,2}$ | ... | $r_{2,m}$ |
| ... | ... | ... | ... | ... |
| user(n) | $r_{n,1}$ | $r_{n,2}$ | ... | $r_{n,m}$ |

There are various methods of combining and/or synthesizing the inter-user QoS ranking list P and the inter-carrier scheduling ranking lists $S_i$ to produce a synergic ranking matrix R.

According to an example embodiment of the present invention, the synergic ranking value $r_{i,j}$ is calculated according to Equation (1):

$$r_{i,j}=w_s \cdot s_{i,j}+w_p \cdot p_j\ i=1, 2, \ldots, n;\ j=1, 2, \ldots m \quad (1)$$

where, $0<w_s$, $w_p<1$ are weighting factors for the inter-user QoS priority and the inter-carrier scheduling priority, respectively. Further, according to an example embodiment of the present invention, $w_s$ and $w_p$ may be set up such that $w_s+w_p=1$. As such, $w_s$ and $w_p$ may be used to balance the importance of the inter-user QoS and inter-carrier scheduling for a MC wireless communication system. For example, if the inter-user QoS ranking list P is considered more important than inter-carrier ranking list $S_i$ in the MC wireless communication system, then $w_p$ shall be larger than 0.5.

The synergic ranking value $r_{1,2}$ represents the scheduling priority of user(1) in RF carrier $f_2$. According to an example embodiment of the present invention, a low synergic ranking value $r_{i,j}$ indicates a low scheduling priority for a user(i), for example MS 205 or UE 105, on a RF Carrier $f_m$. Further, a synergic ranking value $r_{i,j}$ equal to 0 indicates that carrier $f_j$ cannot be scheduled to user i.

Referring back to the flow chart in FIG. 3, once a synergic ranking matrix R is generated, the scheduling algorithm proceeds to step S200. In step S200, the synergic ranking matrix R is analyzed and the synergic ranking value $r_{i,j}$ having the highest priority among all the unscheduled users in a round of scheduling is selected.

In step S300 of FIG. 3, a required load for transmitting data associated with the selected synergic ranking value $r_{i,j}$ (i.e. data from the selected user(i) on the RF carrier $f_j$) is calculated. Calculating the required load for a data transmission is well known in the art and thus will not be discussed herein for the sake of brevity.

In step S400, whether or not the required load calculated in step S300 will overload the RF carrier $f_j$ is determined. If the determination in step S400 indicates that adding the required load to the current load of the RF carrier $f_j$ associated with the selected synergic ranking value $r_{i,j}$ would not overload RF carrier $f_j$, then the user(i) associated with the selected ranking value $r_{i,j}$ is scheduled in this round of scheduling as shown in step S500 of FIG. 3. Conversely, if the determination in step S400 indicates that adding the required load to the current load of the RF carrier $f_j$ associated with the selected synergic ranking value $r_{i,j}$ would overload the RF carrier $f_j$, then the scheduling of the user(i) data in RF carrier $f_j$ is skipped in this round of scheduling as shown in step S600.

Referring to the flowchart in FIG. 3, the scheduling algorithm then proceeds to step S700. In step S700, a user(i) associated with the selected synergic ranking value $r_{i,j}$ is marked as scheduled in this round of scheduling and the carrier load in RF carrier $f_j$ is adjusted. In particular, if the determination in step S400 indicates that the RF carrier $f_j$ will not be overloaded by adding the required load to the current load of RF carrier $f_j$, the load of the RF carrier $f_j$ is increased by the required load, whereas if the determination in step S400 is that the RF carrier $f_j$ will be overloaded by adding the required load to the current load of RF carrier $f_j$, the load of the RF carrier $f_j$ remains unchanged.

The scheduling algorithm illustrated in FIG. 3, then proceeds to step S800. In step S800, if there is at least one user(i) that is not marked as scheduled during the current round of scheduling, the scheduling algorithm proceeds to back to step S200 and steps S200 to S800 are repeated, otherwise the scheduling algorithm is ended.

As described above, example embodiments of the present invention provide an effective and/or simple way to schedule MC RF resources by creating and using a Synergic Ranking Matrix R that is based on both an inter-user QoS ranking list P and an inter-carrier scheduling ranking list S Example embodiments of the present invention being thus described, it will be obvious that the same may be varied in many ways. Such variations are not to be regarded as a departure from the invention, and all such modifications are intended to be included within the scope of the invention. For example, the example embodiments of the present invention are not intended to restrict the way an inter-user QoS ranking list P and an inter-carrier scheduling ranking list S are synthesized; moreover, this invention is intended to cover all forms of generating an inter-user QoS ranking list P, generating an inter-carrier scheduling ranking list S, using both the inter-user QoS ranking list P and the inter-carrier scheduling ranking list S to create a synergic ranking list R and using the synergic ranking list R to effectively schedule RF resources in a MC communication system.

We claim:

1. A method of scheduling at least one of a plurality of mobile stations for data transmission in a multi-carrier wireless communication system, the method comprising:
    creating, by a network device, a ranking matrix that includes a ranking list for each of a plurality of carriers, the ranking list including a ranking value for each of the plurality of mobile stations, the ranking value being based on RF measurements received from the plurality of mobile stations and a Quality of Service (QoS) of the plurality of mobile stations; and
    first scheduling, by the network device, at least one mobile station on at least one of the plurality of carriers of the multi-carrier wireless communication system based on the ranking matrix and a capacity of the plurality of carriers, the at least one mobile station being scheduled on the at least one of the plurality of carriers once per scheduling cycle, the first scheduling including,
        selecting a mobile station to schedule and the carrier based on the ranking value corresponding to a highest priority,
        determining if the selected carrier can support the selected mobile station during a scheduling interval based on a capacity of the selected carrier, the determining step,
        calculates a load for transmitting data from the selected mobile station, and determines if the selected mobile station should be scheduled on the selected carrier based on the calculated load, and
        determines the calculated load would overload the selected carrier, the second scheduling step does not schedule the selected mobile station and the selected mobile station is marked as processed, and
    second scheduling the selected mobile station if the determining step determines the calculated load would not overload the selected carrier, the selected mobile station is marked as processed, and a carrier load of the carrier is increased by the calculated load.

2. The method of claim 1, wherein the creating step comprises:
    assigning a first value to each of the plurality of mobile stations for each of the plurality of carriers based on the RF measurements to generate a first list, the first value representing each of the plurality of mobile stations preference for each of the plurality of mobile carriers; and
    generating the ranking matrix based on the first list.

3. The method of claim 2, wherein the RF measurements received from the plurality of mobile stations are Channel Quality Indicator values or Data Rate Control (DRC) values.

4. The method of claim 2, wherein creating step further comprises:
    assigning a second value to each of the plurality of mobile stations based on the QoS of each of the plurality of mobile stations to generate a second list, the second value representing a priority of each mobile station relative to other mobile stations of the plurality of mobile stations, and wherein
    the generating step generates the ranking matrix based on the first list and the second list.

5. The method of claim 4, wherein the second value is based on a QoS profile of each of the plurality of mobile stations.

6. The method of claim 4, wherein the generating step combines the first list and second list according to equation (1)

$$r_{i,j} = w_s s_{ij} + w_p p_j \; i=1, 2, \ldots, n; j=1, 2, \ldots m \quad (1)$$

wherein, $r_{i,j}$ represents the ranking value, i represents a number of mobile stations, j represents a number of the carriers, $S_{ij}$ represents the first value of the first list, $p_j$ represents the second value of the second list and $w_s$ and $w_p$ are weighting factors.

7. The method of claim 1, wherein the selecting step selects a mobile station not previously processed during the scheduling interval.

8. The method of claim 1, wherein the second scheduling step further comprises:
    marking the selected mobile station as processed so the selected mobile station is only selected once during a scheduling interval.

9. The method of claim 8, wherein the second scheduling step further comprises:
    ascertaining if all of the mobile stations of the plurality of mobile stations are marked as processed; and
    ending the scheduling cycle based on the ascertaining step.

10. The method of claim 9, wherein the second scheduling step continues until all of the mobile stations of the plurality of mobile stations are marked as processed.

11. The method of claim 1, wherein the creating step comprises:
    assigning a second value to each of the plurality of mobile stations based on the QoS of each of the plurality of mobile stations to generate a second list, the second value representing a priority of each mobile station relative to other mobile stations of the plurality of mobile stations, and
    generating the ranking matrix based on the second list.

12. A method of scheduling at least one of a plurality of mobile stations for data transmission in a multi-carrier wireless communication system, the method comprising:
    creating, by a network device, a ranking matrix that includes a ranking list for each of a plurality of carriers, the ranking list including a ranking value for each of the plurality of mobile stations, the ranking value being based on RF measurements received from the plurality of mobile stations and a Quality of Service (QoS) of the plurality of mobile stations;
    first scheduling, by the network device, at least one mobile station on at least one of the plurality of carriers of the multi-carrier wireless communication system based on the ranking matrix and a capacity of the plurality of carriers, the at least one mobile station being scheduled on the at least one of the plurality of carriers once per scheduling cycle, the first scheduling including, selecting a mobile station to schedule and the carrier based on the ranking value corresponding to a highest priority, determining if the selected carrier can support the selected mobile station during a scheduling interval based on a capacity of the selected carrier, the determining step, calculates a load for transmitting data from the selected mobile station, and determines if the selected mobile station should be scheduled on the selected carrier based on the calculated load, and determines the calculated load would overload the selected carrier, the second scheduling step does not schedule the selected mobile station and the selected mobile station is marked as processed, and second scheduling the selected mobile station if the determining step determines the calculated load would not overload the selected carrier, the selected mobile station is marked as processed, and a carrier load of the carrier is increased by the calculated load;

processing the at least one mobile station; and changing the load of the at least one of the plurality of carriers.

* * * * *